Patented June 17, 1924.

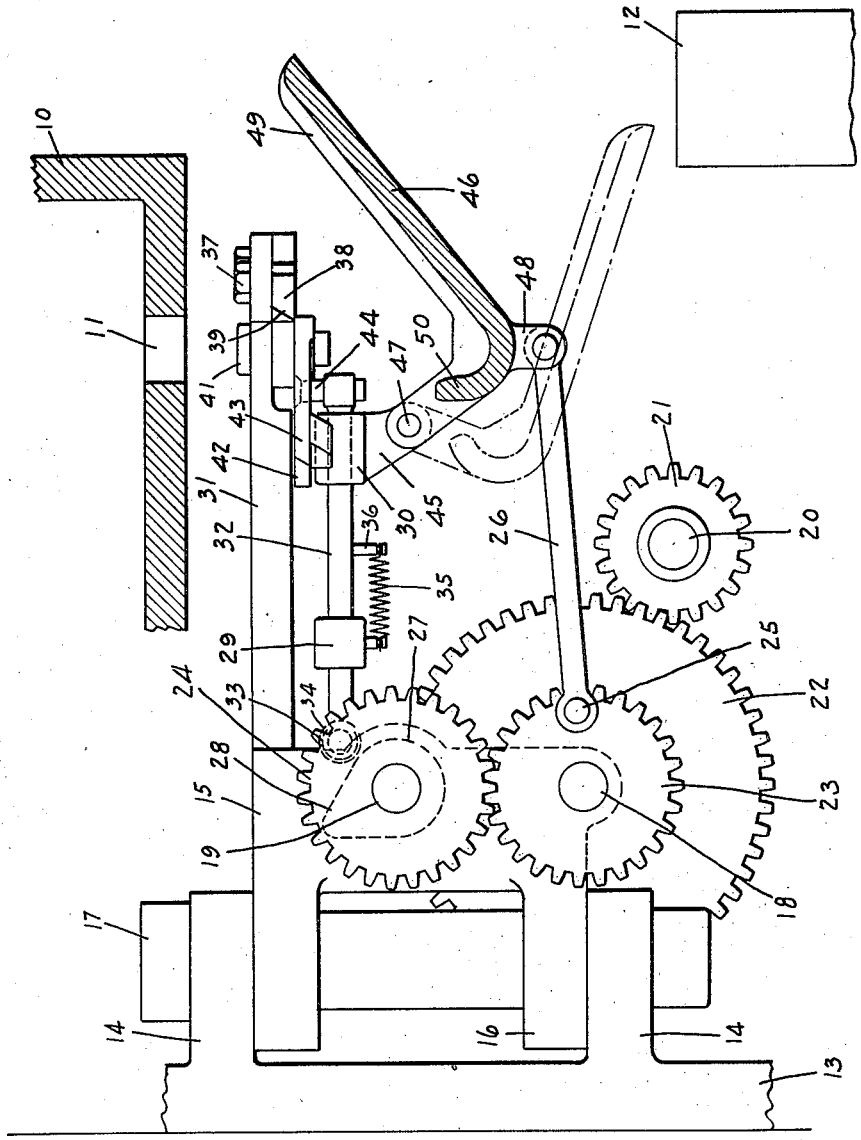

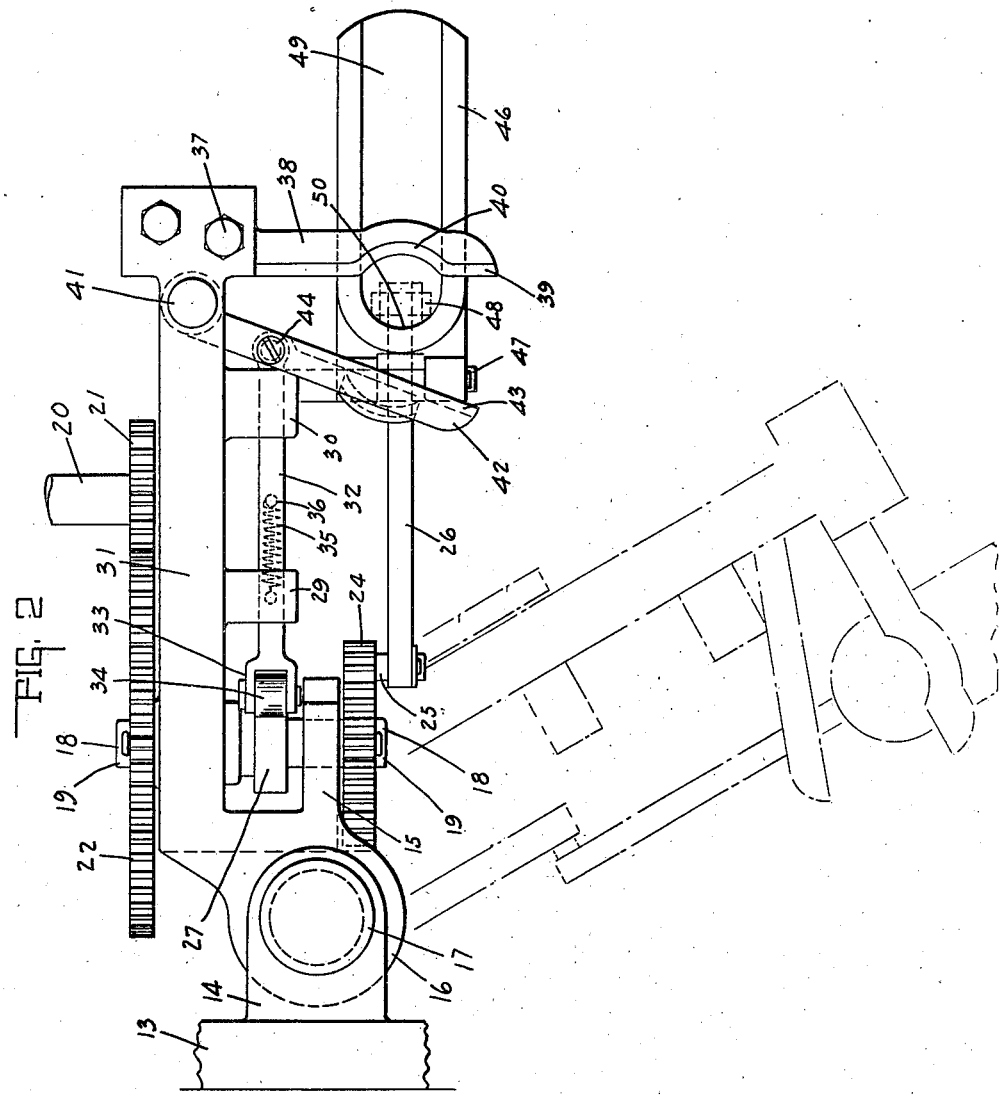

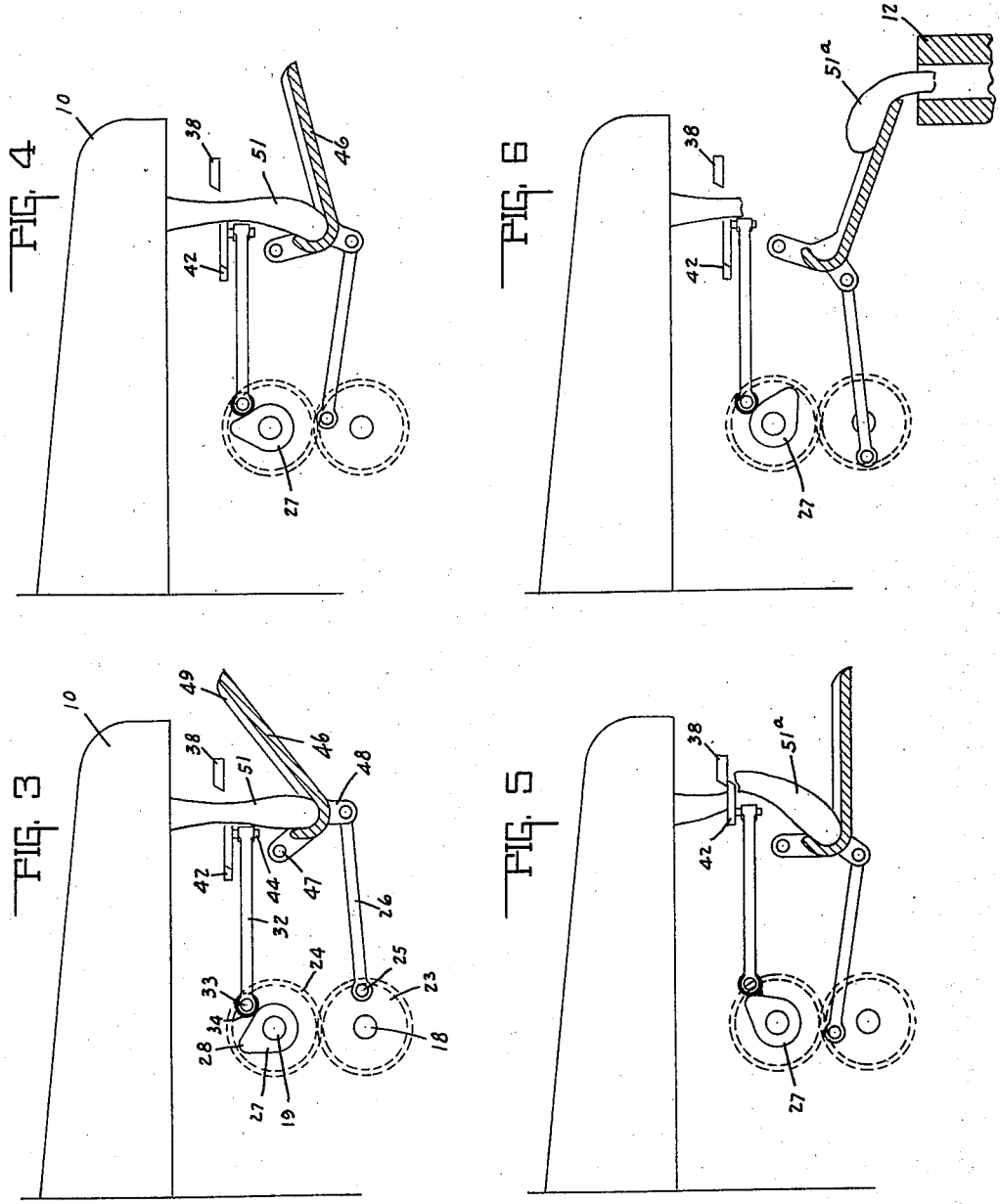

1,497,929

UNITED STATES PATENT OFFICE.

EDWARD MILLER, OF COLUMBUS, OHIO.

GLASS FLOWING AND SHEARING DEVICE.

Application filed April 8, 1921. Serial No. 459,644.

*To all whom it may concern:*

Be it known that I, EDWARD MILLER, a citizen of the United States, and a resident of Columbus, county of Franklin, and State of Ohio, have invented a certain new and useful Glass Flowing and Shearing Device; and I do hereby declare that the following is a full, clear, and exact description thereof, reference being had to the accompanying drawings, in which like numerals refer to like parts.

This invention relates to glass flowing and shearing devices.

The chief object of this invention is to provide means associated with a glass discharging spout and a glass receiving mold such that a measured or predetermined amount of glass will be discharged from the spout into the mold to form an article of glassware.

The chief feature of this invention consists in associating with a continuous glass discharging spout and a glass receiving mold suitable shearing means for severing a predetermined amount of discharged glass from the remainder thereof, and means for conveying the severed portion of the glass to the glass receiving mold.

Another feature of the invention consists in the details of construction and the operation of the glass severing shears; and another feature of the invention consists in the details of construction and the operation of the tiltable glass conveying means associated with the shearing means.

Still a further feature of the invention consists in actuating the shearing means and the conveying means in timed relation with each other.

The full nature of the invention will be understood from the accompanying drawings and the following description and claims.

In the drawings, Fig. 1 is a side elevational view of the invention showing the same associated with a glass discharging spout and a glass receiving mold, parts being broken away and certain parts being shown in section to show other parts in detail. Fig. 2 is a plan view of the invention, parts thereof being shown in the dotted line position indicating the inoperative position of the invention. Figs. 3, 4, 5 and 6 are semi-diagrammatic and elevational views showing the various steps in the operation of the invention. Fig. 3 illustrates the parts of the invention in the glass receiving position when associated with the glass continuously discharging spout. Fig. 4 illustrates said parts in the glass severing position. Fig. 5 illustrates the same parts with the severed portion of the glass after separation being received by the conveying means. Fig. 6 illustrates retraction of the severing means so as to permit the invention to receive another portion of glass and also shows the conveying means discharging the previously severed portion of glass into a suitable glass receiving mold.

In the invention 10 indicates a suitable glass discharging spout, said spout being provided with the glass discharging outlet or orifice 11. Beneath said spout and in juxtaposition thereto is a suitable glass receiving mold 12 and interposed between said discharge orifice and said mold is suitable means for severing the continuously discharging glass into predetermined severed glass portions, and associating therewith suitable glass conveying means for receiving the severed glass portion and then transporting the same so that said severed glass portion will be discharged into the glass receiving mold.

13 indicates a suitable support provided with the bracket portions 14 in parallel and spaced relation with each other. Said bracket portions are adapted to support a suitable carriage 15, said carriage being provided with corresponding bracket portions 16. Said parallel brackets 14 and 16 cooperate with each other and the hinge bolt or pin 17 to hingedly support the carriage upon the supporting base or member 13 such that said carriage, upon which is supported the shearing means and the glass conveying means, may be moved from the full line position shown in Figs. 1 and 2 to the dotted line position shown in the last mentioned figure. Rotatably supported by said carriage is a pair of shafts 18 and 19, said shafts in the present instance being in superposed relation. Suitably supported upon the framework (not shown) is another shaft 20, and rotatable therewith is a driving pinion or gear 21. Driven by said pinion 21 is a large gear 22 carried upon the shaft 18 Also carried upon said shaft and rotatable thereby is a gear 23 which meshes with the gear 24 upon the shaft 19. Thus power supplied by the shaft 20 will be transmitted to and through the shafts 18 and 19. Associated with the gear 23 is a pin member 25. The pin member 25 is eccentrically positioned upon said gear, and associated therewith is an eccentric rod 26, which rod actuates the glass conveying means, as will be more fully described hereinafter.

Upon the shaft 19, as shown clearly in Figs. 1 and 2, there is secured a cam member 27, which cam member is provided with an actuating tooth or camming portion 28. Slidably supported in the bracket portions 29 and 30 which project transversely of the bracket or plate portion 31 is a tappet 32. The tappet rod 32 is bifurcated at 33 and rotatably supports a roller or cam follower 34. A spring member 35 has one end secured to the bracket portion 29 and the other end secured to a depending hook 36 secured to the tappet rod 32. Thus the spring 35 normally maintains the roller or cam follower 34 in contact with the cam member 27 such that said cam member is adapted to actuate the tappet rod when the projection 28 engages the cam follower 34.

The free end of the tappet rod 32 is associated with the shearing mechanism to operate the same. To the plate portion 31 of the carriage is rigidly secured, as by means of the bolt 37, a stationary shearing blade 38 provided with the beveled edge 39. The stationary blade 38 is also provided with a curved portion 40 such that the material severed will be moved so as to be positioned in the curved portion 40 and retained therein during the severing operation. Pivotally supported at 41 upon the plate portion 31 is a movable shearing blade 42 provided with a beveled edge 43. Intermediate the free end of the movable shearing blade 42 and the pivot support 41 is a screw bolt 44, said bolt being secured to the free end of the cam actuated tappet rod, as shown clearly in Fig. 1. It will be remembered that the spring 35 maintains the shearing member 42 in the non-shearing or open position, as shown in Fig. 2, and the cam 27 positively closes said shears to sever the glass discharged from the spout orifice.

The bracket portion 30 is provided with a depending supporting portion 45. An L-shaped spoon member 46 is hingedly supported at 47 upon the depending supporting member 45. An ear 48 at the angle of said L portion and depending therefrom is pivotally connected to the eccentric rod 26 such that in the movement of the eccentric pin 25, said pin will cause the spoon member 46 to move from the full line position shown in Fig. 1 to the dotted line position shown in said figure. The spoon member 46 is provided with a suitable groove 49 to form a trough therein, and the head of said trough is closed by a curved portion 50 which cooperates with said trough in the elevated position to form a pocket into which the severed glass portion falls when severed by the shears.

Since the shaft 20 and gears 21 and 22 actuate both mechanisms, it will be understood that said mechanisms operate in timed relation with each other. Figs. 3, 4, 5 and 6 illustrate the various steps in a complete cycle of the invention. In Fig. 3 the shears as has heretofore been described, are in the normal or open position such that the descending glass portion 51 passes through the same and is received by the cup portion of the L-shaped spoon. Continued operation of the device causes the movable shearing member 42 to approach the stationary shearing member 38 and sever the same from the discharging glass, as shown in Figs. 4 and 5. During this operation the pivotally supported spoon is being tilted upon its pivot, and as illustrated in Fig. 6, said spoon discharges the severed glass portion 51$^a$ of the glass into the mold 12. At the same time the movable shearing member 42 has been retracted to the open position, so that the discharging glass will continue to pass through said shears and be received upon the spoon when the latter is moved after discharging the severed portion from the blank mold from the position shown in Fig. 1 to the position shown in Fig. 3.

While the invention has been described in considerable detail, many modifications thereof will readily suggest themselves to those skilled in the art, and it will be understood that these modifications are all considered to be within the broad purview of this invention.

The invention claimed is:

1. In a glass flowing and shearing device, the combination with a glass discharging spout, and a glass receiving mold, of shearing means positioned beneath said spout, said shearing means comprising a pair of shearing members, yielding means normally maintaining said shearing members in the open position to permit said glass discharging spout to discharge glass through the same, means for closing said shearing means in opposition to said yielding means for severing the glass passing through said shears, a pivotally supported spoon positioned beneath said shearing means and adapted to receive the severed glass therefrom, and means for tilting said spoon to deposit the severed glass into the mold.

2. In a glass flowing and shearing device, the combination with a glass discharging spout, and a glass receiving mold, of shearing means positioned beneath said spout, said shearing means comprising a pair of shearing members, yielding means normally maintaining said shearing members in the open position to permit said glass discharging spout to discharge glass through the same, means for closing said shearing means in opposition to said yielding means for severing the glass passing through said shears, a pivotally supported spoon positioned beneath said shearing means and adapted to receive the severed glass therefrom, means for tilting said spoon to deposit the severed glass into the mold, and means for simultaneously actuating said shearing means and said spoon tilting means in timed relation.

3. In a glass flowing and shearing device, the combination with a continuous glass discharging spout, a glass receiving mold, and shearing means including a pair of relatively movable elements positioned beneath said spout, of an engaging trough-shaped spoon having an open and closed end, a pivotally supported end and positioned beneath said shearing means upon an axis parallel to the plane including the shearing means, and means connected to said spoon for tilting the same upon its pivot to discharge from the open end of the spoon into the mold in timed relation with the operation of the shearing means.

4. In a glass flowing and shearing device, the combination with a continuous glass discharging spout, a glass receiving mold, and shearing means including a pair of relatively movable elements positioned beneath said spout, of an engaging trough-shaped spoon having an open and closed end, a pivotally supported end adjacent the closed end and positioned beneath said shearing means upon an axis parallel to the plane including the shearing means, and means connected to said spoon for tilting the same upon its pivot to discharge from the open end of the spoon into the mold in timed relation with the operation of the shearing means.

In witness whereof, I have hereunto affixed my signature.

EDWARD MILLER.